Feb. 24, 1959  H. D. CANAZZI  2,874,534
UNITARY ENGINE AND SUPERCHARGER
Filed June 29, 1956  5 Sheets-Sheet 1

INVENTOR.
Henry Donald Canazzi.
BY
Raymon E. Rousseau
ATTORNEY.

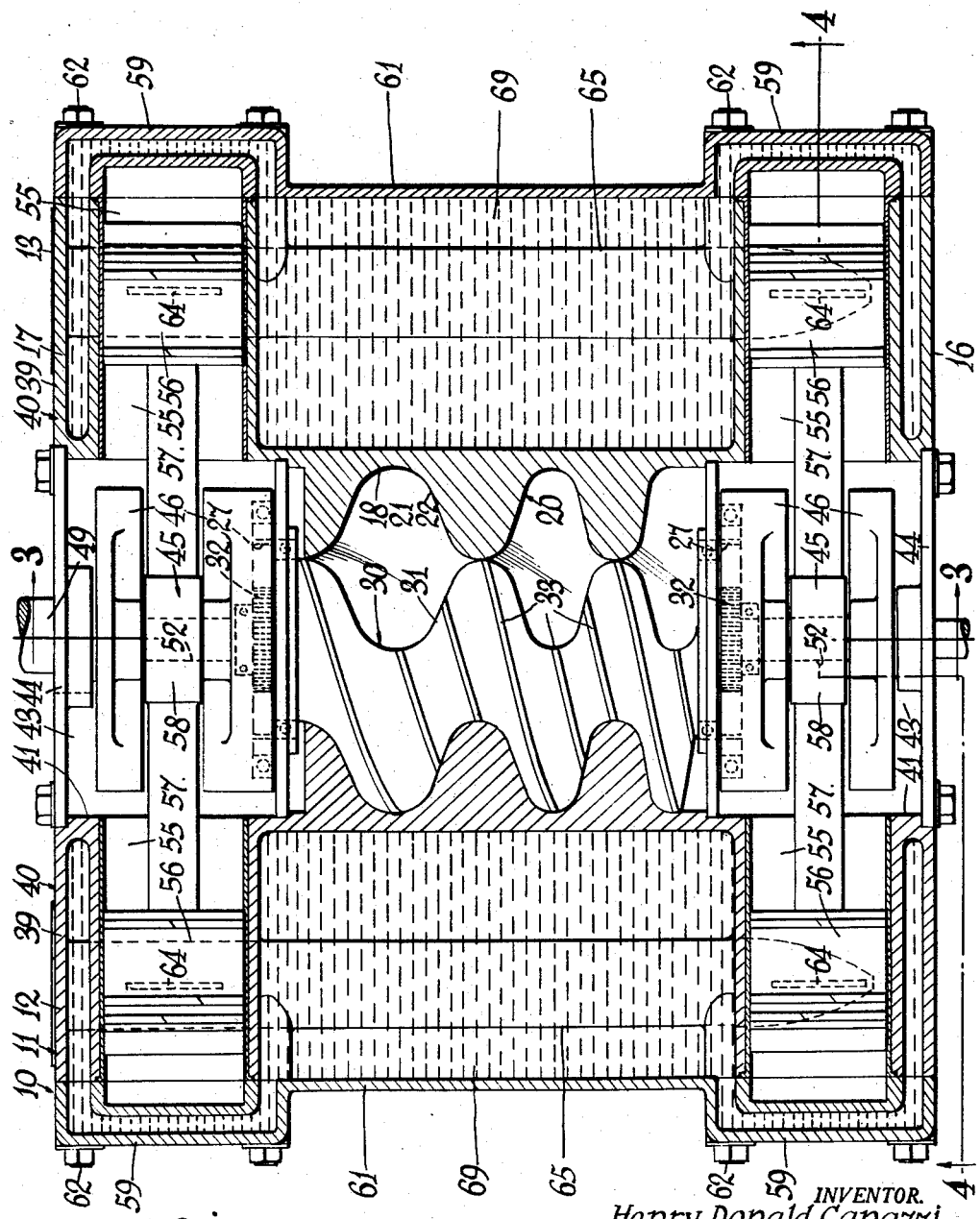

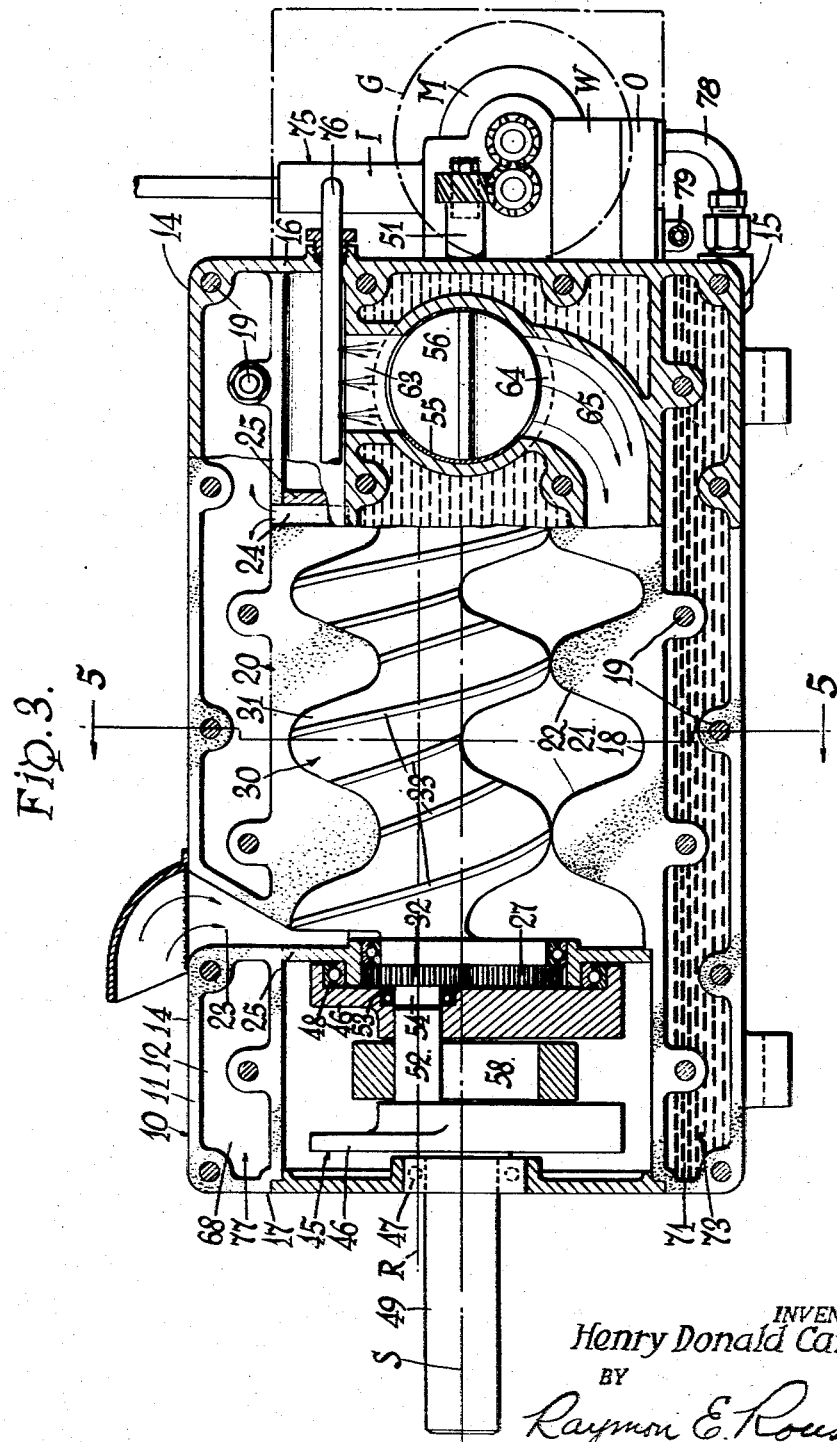

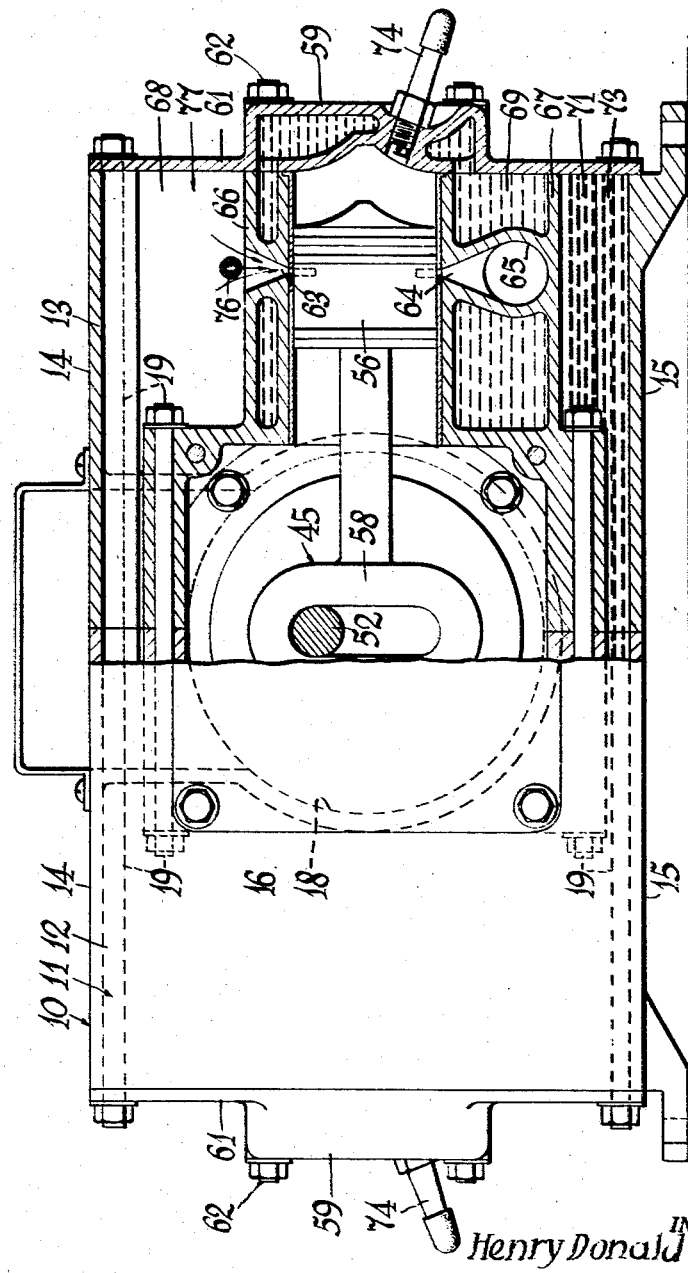

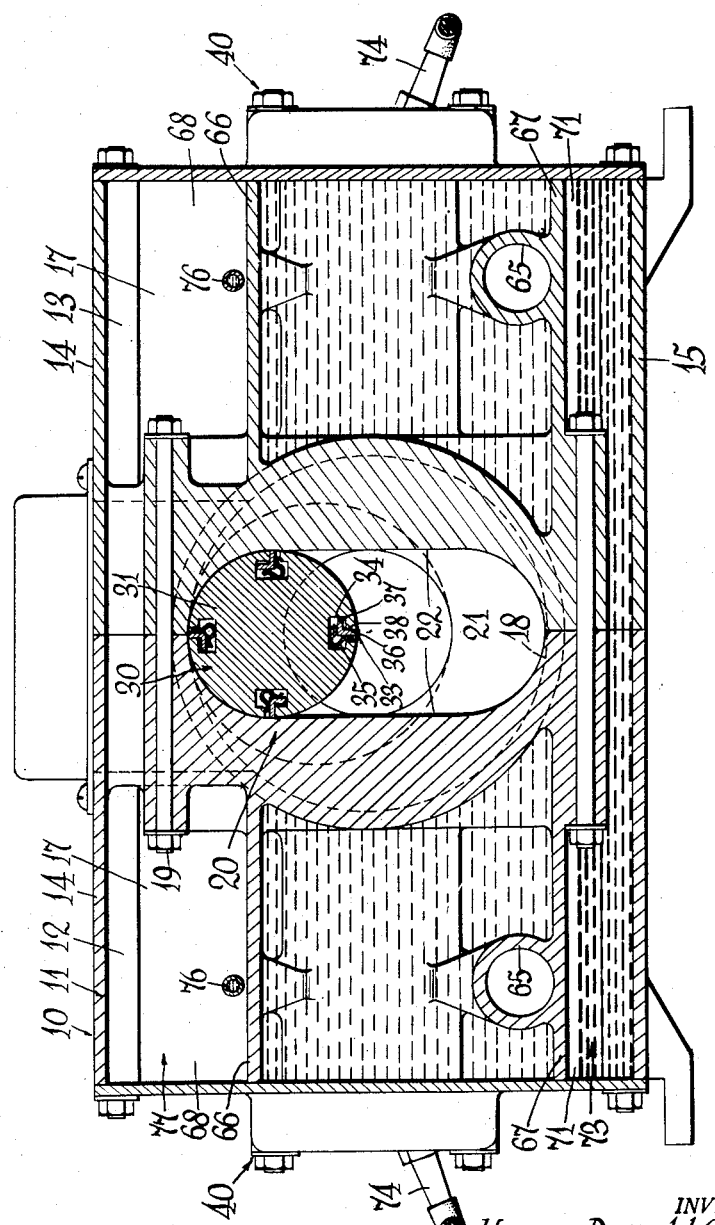

United States Patent Office 2,874,534
Patented Feb. 24, 1959

2,874,534

UNITARY ENGINE AND SUPERCHARGER

Henry Donald Canazzi, Buffalo, N. Y.

Application June 29, 1956, Serial No. 594,944

6 Claims. (Cl. 60—31)

My invention relates to engines and more particularly to an improved compact unitary supercharged internal combustion engine.

The prior practice of supercharging internal combustion engines to improve their volumetric and overall efficiency, thereby to increase the horsepower output of the engine, has been to provide the engine with a type of supercharger having characteristics considered suitable to the purpose. However one disadvantage of such prior practice is that the shape and size of the engine and supercharger have militated against a compact arrangement so that they have required considerable space.

Another disadvantage of prior supercharged engines, over and above their space requirements is that they have been usually built of complete separate engines and supercharger units which have been costly to manufacture.

Furthermore prior superchargers have usually required that the rotor be finely balanced and minutely spaced from the stator or in sliding contact therewith and driven at relatively high speeds to produce the desired supercharging effect so that such parts have been costly and subject to rapid wear, and because of the sliding contact have had considerable friction losses.

The objects of my invention are to provide a supercharged engine which will be efficient, which will require considerably less space than prior supercharged engines of equal horsepower and which will not require a supercharger having high speed sliding motion between closely fitted parts to produce the desired supercharging effect.

Another object is to provide a supercharged engine construction allowing the engine and the supercharger units to be compactly arranged in a unitary structure.

Another object is to provide a unitary supercharged engine construction wherein the walls of the supercharger, the combustion chamber, the exhaust passages, a supercharged air reservoir and a lubricating oil reservoir may be in direct heat exchange relation with a liquid cooling medium.

Another object is to provide a supercharged engine with a unitary plenum or surge tank for the storage of supercharged air.

Another object is to provide a unitary supercharged engine with a helically shaped rotor carrying a sealing means formed, arranged and operable in a manner to engage the walls of a stator chamber with a pressure sealing rolling contact, thereby to compress air admitted to the chamber with a minimum of friction and wear between the rotor and stator.

Another object is to provide a unitary supercharged engine wherein helically shaped rotor and stator elements and other elements are formed to require a minimum of finishing operations.

These and other objects of my invention will become apparent from a perusal of the following detailed description and the drawings, wherein:

Figure 2 is a horizontal sectional view taken about on the line 2—2 of Figure 1.

Figure 3 is a vertical sectional view taken about on the line 3—3 of Figure 2.

Figure 4 is a combined elevational and sectional view taken about on the line 4—4 of Figure 2, and Figure 5 is a vertical sectional view taken about on the line 5—5 of Figure 3.

Figure 1:
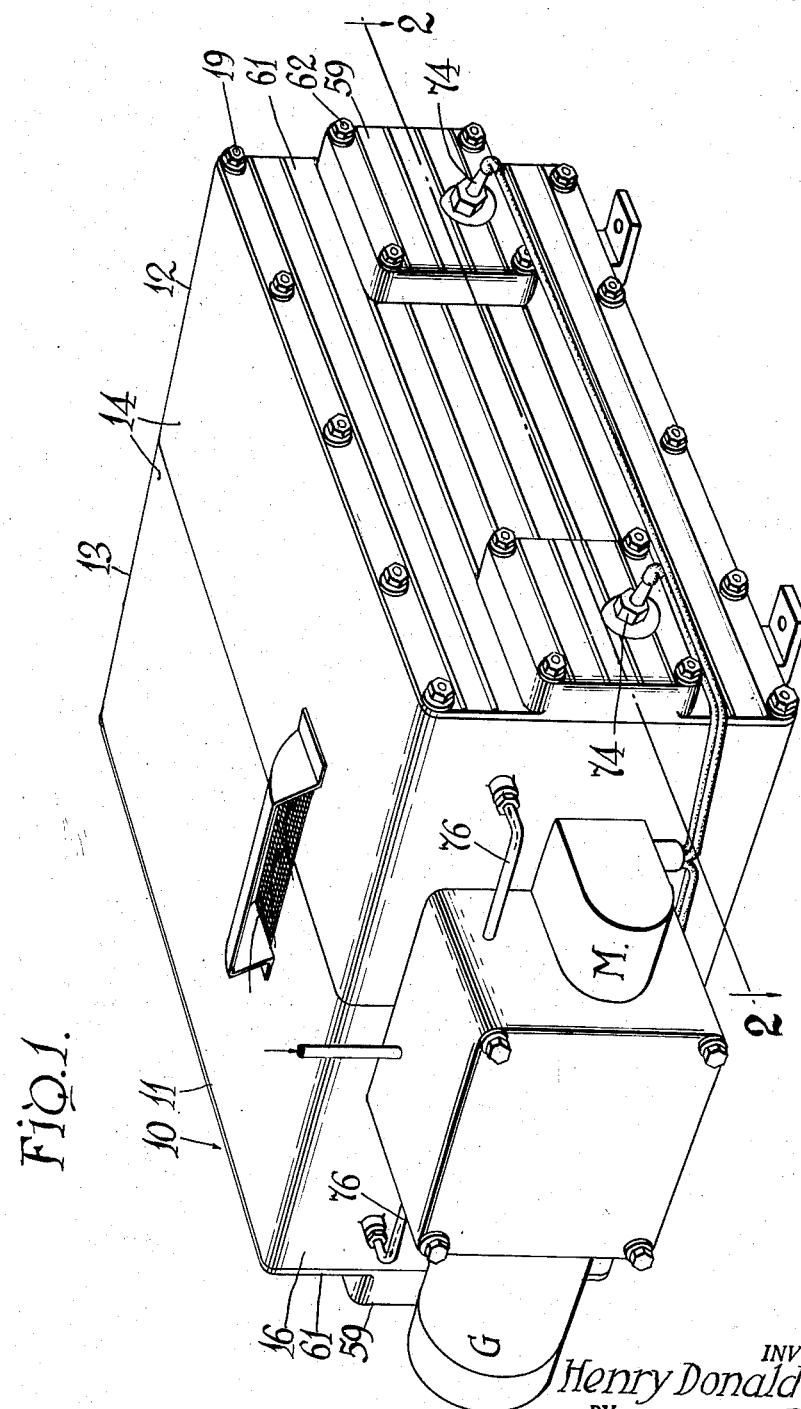
Figure 1 is a perspective view showing my improved unitary supercharged engine.

Generally stated I have combined my improved type of air compressor or supercharger with engine units and other units and accessories in such a manner that, notwithstanding my engine is completely water cooled, it requires less space than prior supercharged engines of comparable horsepower and is a relatively small compact engine which, because its simple component parts require a minimum of machining operations, may be fabricated and assembled at a low cost. Furthermore my supercharged engine is well adapted to use of a system of metered power injection of the fuel and use of the two-cycle principle of engine operation, whereby a maximum efficiency and horsepower are obtained for an engine of a given size.

The supercharging unit of my present invention is a marked improvement over that shown in my Patent No. 2,553,548, wherein a single varying pitch thread-like rotor has direct rolling contact with a double varying pitch stator, and has both a planetary motion or rotation and rotation about its own axis which produces the compressor action described, because I now provide the rotor with a plurality of resiliently mounted elements which resiliently engage the stator to provide the necessary seal between it and the stator and which eliminate the prior need for an extremely accurate fit between the rotor and the stator. These elements reduce friction and provide a satisfactory seal notwithstanding minor imperfections in the surfaces of the stator they engage and also compensate for wear, thereby increasing the life of the supercharger.

Further improvements of my engine reside in the formation and arrangement of its component units.

Referring now to the drawings it will be seen that I have provided an extremely compact water cooled supercharged two-cycle engine 10. In my engine a rectangularly shaped body portion 11 is formed of a right-hand half casting 12 and a left-hand half casting 13 each of which includes a top wall 14, a bottom wall 15 and end walls 16 and 17. The castings intermediate their top, bottom and end walls are each formed with a semi-circular recess 18 which when the half castings are alined and have their inner edges sealingly secured together by suitable through bolts 19 provide a tubular stator chamber 21 of a supercharger 20. The chamber 21 is provided with an internal double pitch thread 22 having a varying pitch angle which gradually decreases from an air inlet conduit 23 to an air outlet opening 24 (Figure 3). The prior difficulty of forming the thread 22 in a solid casting is simply overcome by casting each of its complementary halves in one of the recesses 18 and the thread is polished by any suitable means since it need not be extremely accurately finised.

The ends of the stator chamber 21 are each sealed off by a removable closure plate 25 to provide the supercharger chamber 21, which except for its inlet conduit 23 and its outlet opening 24, is completely sealed. The plates 25 each carry a suitab'e bearing 26 and an internal ring gear 27 each in axial alinement with the axis S of the stator chamber 21. As best seen in Figure 3 a rotor 30 having a body formed concentric with its axis R and in the form of a varying pitch helical screw 31 has each of its ends formed to be carried by and concentric with the bearings 26.

Outwardly beyond each bearing 26 and concentric with the axis R each end of the screw 31 is provided with a gear 32 which is rigidly secured thereon and engages the associated ring gear 27 so that during gyration or revolution of the screw 31 about the axis S in one direction it revolves about its own axis R in the opposite direction and because the diameter of the gears 27 are twice the diameter of the gears 32 the screw 31 makes two revolutions about its axis R for each revolution about the axis S, thereby substantially doubling the volume of the air compressed by the supercharger 20.

The air compressing action of the rotor with respect to the stator is the same as in my prior patent except that in my present supercharger the rotor is slightly spaced from and does not directly engage the stator, thereby overcoming the prior necessity for extremely accurate finishing and fitting of these parts. To provide the necessary seal between the slightly spaced interengaged surfaces of the stator and the rotor the latter is provided with a plurality of sealing fins or strips 33 which are twisted throughout their length to match the varying helical pitch angle of the rotor body 31 and being inserted in like helically shaped slots 34 in the rotor are forced radially outwardly by suitable springs 35 into resilient rolling contact with the closely adjacent helically shaped surfaces of the stator thread 22. The sealing strips 33 not only provide the necessary seal between the slightly spaced rotor and stator surfaces but also increase the usable life of the supercharger by compensating for wear of these surfaces and when worn may be replaced.

Each strip 33 is preferably L-shaped in cross section and each slot 34 is preferably T-shaped in cross section to provide room for the strip and its spring 35 which is preferably C-shaped in cross section.

As shown in Figure 5 each strip 33 is positioned in its slot 34 with its radially disposed leg 36 bearing against the far side of the stem portion of its T-shaped slot to resist further movement in a direction opposite to the direction of rotation of the rotor about its axis R and the spring 35 is formed and positioned to exert a force acting against the laterally disposed leg 37 of the strip to hold its outer edge in resilient sealing contact with the stator thread 22 and to exert a force acting against the radially disposed leg 36 to resiliently hold it against said far side 38 of the T-slot. For ease of illustration only four of the sealing elements have been shown, however the number of sealing elements may be increased to provide the described degree of sealing between the rotor and stator surfaces.

In order to provide a relatively inexpensive supercharged engine having the desired characteristics and horsepower and having the smallest possible space requirements I have found it highly advantageous to form and integrally cast a water cooled engine block 39 of a two-cycle engine 40 at each end of the engine body 11 in contiguous relation to the supercharger 20 so that the engines 40 may be directly and drivingly connected to the supercharger which in turn directly supercharges the engines. Accordingly each end of the castings 12 and 13, in line with and contiguous to the supercharger 20, are each cast with a recessed portion 41. The portions 41 when sealingly secured together by the bolts 19 provide a crankcase chamber 43, the outer end of which is sealed preferably by a removable bearing plate 44, which together with the bearing plate 25 rotatably supports a crank mechanism 45 of the associated engine portion 40.

Each crank mechanism 45 includes a spaced pair of suitable counterweighted discs or flywheels 46 rotatably mounted by the bearings 47 and 48, as best shown in Figure 3, for rotation about the axis S. The left-hand crank mechanism includes an output or drive shaft 49 which may be drivingly connected in any suitable manner to whatever mechanism is to be driven by the supercharged engine. The right-hand mechanism includes an accessory drive shaft 51 which as schematically indicated in Figure 3 drives any suitable type of a starter generator G, a fuel injection mechanism I, a magneto M, a water pump W and an oil pump O.

Each crank mechanism also includes a crank pin 52 which extends between the spaced flywheels 46 in a plane spaced from and parallel to its axis of rotation S to provide the desired engine stroke and its axis is conveniently located coincident with the axis R to facilitate the provision of a driving connection between the crank mechanism and the rotor. Still referring to Figure 3 it will be seen that the crank pin 52 terminates short of the inner face of the inner flywheel 46 which concentric with the axis R carries a bearing 53 for supporting and driving a stub shaft 54 formed on the rotor concentric with its axis R, whereby rotation of the flywheel causes the above described rotation of the rotor about the axis S and due to the gear 32 being meshed with the ring gear 27 the rotor rotates twice about its own axis R in a direction opposite to the direction of its rotation about axis S.

Each engine portion 40 includes a pair of cylinders 55 preferably cast as integral alined extensions of their crankcase chamber 43, a piston 56 slidably mounted in each cylinder and operably connected to its crank pin 52 by a connecting rod 57 and a scotch yoke 58 (Figures 3 and 4). The outer end of each cylinder is provided with a removable cylinder head 59 preferably formed as an integral part of a cover plate 61 which is coextensive with and closes the open outer end of the associated half casting.

One of the cover plates 61 is sealingly secured to the outer edges of the castings 12 and 13 by the bolts 19 and a plurality of bolts 62 sealingly secure the head portions to the outer end of their cylinders.

As is common practice in two-cycle engines the upper and lower walls of each cylinder 55 intermediate its ends is provided with circumferentially extending slots to provide an air-fuel intake passage 63 and an exhaust gas passage 64. The exhaust gases from the passages 64 of each casting flow into and are conducted by an exhaust pipe or manifold 65 to and through the end wall 16 of said casting and may be conducted therefrom by a suitable extension (not shown).

Since it is desired to cool the supercharger 20, the crankcase 43, the cylinders 55 and the exhaust manifolds 65 each casting is provided with an upper wall 66 and a lower wall 67 which extend between its end walls 16 and 17 and from its supercharger and crankcase wall portions outwardly into sealed contact with its cover plate 61, thereby dividing the casting into an upper chamber 68 for the storage of supercharged air, a separate intermediate cooling chamber 69 for a cooling liquid and a chamber 71 for a lubricating oil. The formation of the castings 12 and 13 is such that their air chambers directly communicate with each other to provide a suitable plenum chamber or surge tank 77 which, being in direct communication with the supercharger by means of its outlet opening 24, receives and stores supercharged air therein and which, being in direct communication with the cylinders via their intake passages 63, deliver supercharged air to the cylinders. The oil chambers 69 directly communicate with each other to provide an oil reservoir 73 which is connected by a suitable pipe 78 to the inlet of the oil pump O whose outlet is connected by suitable tubes 79 to all of the points to be lubricated. The liquid cooling chambers 69 are separate one from the other but if desired may be readily connected together by any suitable conduit means (not shown). As shown in Figure 4, the cylinder heads 59 and their spark plugs 74 are also liquid cooled.

As indicated by the numerals 75 my engine is provided with a fuel injection mechanism having fuel delivery tubes 76 formed and arranged to deliver and inject metered quantities of fuel through the inlet passages 63 and into the cylinders 55 during admission of supercharged air thereinto. The metered quantity of fuel mixes with the supercharged air to provide an ideal explosive gas, whereby my engine produces more horsepower than other supercharged engines of comparable size.

By reason of its improved construction and the arrangement of its component units my supercharged engine provides better cooling and fuel economy and provides more horsepower at less expense than has heretofore been possible with prior supercharged engines.

It should be understood that the herein shown and described form of engine is intended to exemplify the principles of my invention and that various modifications, rearrangements and combinations of its component parts may be made within the scope of the appended claims wherein I claim:

1. In a compact unitary internal combustion engine and air supercharger therefor, a pair of complementary castings each formed with spaced walls formed and arranged to provide a plurality of contiguous chambers; a pair of walls of each casting each being cast with complementary portions formed to provide a supercharger chamber having a double pitch angle internal continuous stator screw on its inner surfaces, said stator screw having a pitch angle which decreases from one of its ends to its other end; means for sealing the opposite ends of the supercharger chamber; an air inlet passage for the supercharger chamber located at its one end, a second chamber adjacent the supercharger chamber for the storage of supercharged air therein; an air outlet passage located at the other end of the supercharger chamber providing communication between it and the air storage chamber; a varying single pitch angle helical screw rotor rotatably mounted in the end sealing means and formed for rotation in the supercharger chamber in a circular path spaced from and concentric to the axis of the stator screw and about its own axis, the surfaces of said rotor screw being interengaged with and slightly spaced from the surfaces of said stator screw; sealing means conforming to the shape of the outer surface of the rotor screw and resiliently urged into sealing engagement with the adjacent surfaces of the stator screw to provide continuous sealing engagement therebetween; a third chamber located contiguous to the supercharger chamber and formed to provide crankcase and cylinder portions of the engine; an air intake port in each cylinder; a passage between each intake port and the second chamber for admitting supercharged air into the cylinder; means operably mounted in said engine crankcase and cylinder portions and operably connected to the rotor screw, whereby, during operation of the engine, air is compressed by the supercharger and forced into the storage chamber and such air is directed into the engine to improve its volumetric efficiency; and a fourth chamber for circulation of a liquid coolant therein, said chamber being contiguous to and in heat exchange relation to the other chambers, thereby to maintain the engine and supercharger at efficient operating temperatures.

2. A compact unitary internal combustion engine and air supercharger therefor as set forth in claim 1 wherein the walls of said chambers are arranged in mutual reinforcing relation, thereby allowing the use of lighter wall sections and a lighter construction.

3. A compact unitary internal combustion engine and supercharger therefor as set forth in claim 1 wherein an exhaust gas manifold extends from an exhaust port in each cylinder and extends through the liquid coolant chamber, thereby to cool the exhaust manifold and the exhaust gases passing therethrough.

4. A compact unitary internal combustion engine and a supercharger therefor as set forth in claim 1 wherein the rotor screw is formed with a concentric axial extension engaged with an engine part rotatable about an axis coincident with the axis of the stator screw and spaced from the axis of said extension, a spur gear is secured upon said extension, and an internal ring gear of greater diameter than the spur gear is meshed therewith and fixed against rotation with its axis coincident with the axis of the stator screw and the engine part whereby during one revolution of the engine part the rotor screw makes one revolution about the coincident axes and more than one revolution about its own axis thereby increasing the air compressing capacity of the supercharger.

5. A compact unitary internal combustion engine and an air supercharger therefor as set forth in claim 1 wherein a fifth chamber serves as a reservoir for lubricating oil and said oil chamber, being in heat exchange relation with the cooling chamber, maintains the temperature of the oil therein within a desired range.

6. A compact unitary combined internal combustion engine and supercharger therefor as set forth in claim 1 wherein the rotor screw is formed with a plurality of radially disposed recesses each following the pitch angle thereof and each being transversely shaped to receive and retain a sealing strip, a sealing strip longitudinally and transversely shaped for limited radial sliding movement in each recess, and resilient means acting between a wall of the recess and the associated strip for resiliently maintaining the strip in continuous sealing engagement with the surface of the stator screw and for compensating for wear of said strips.

References Cited in the file of this patent
UNITED STATES PATENTS

| | | |
|---|---|---|
| 1,585,453 | Willamson | May 18, 1926 |
| 2,060,187 | Fernstrum | Nov. 10, 1936 |
| 2,228,637 | Mercier | Jan. 14, 1941 |
| 2,504,230 | Smith | Apr. 8, 1950 |
| 2,506,142 | Echard | May 2, 1950 |
| 2,553,548 | Canazzi et al. | May 22, 1951 |
| 2,615,436 | Pawl | Oct. 28, 1952 |
| 2,622,787 | Nilsson | Dec. 23, 1952 |
| 2,753,809 | Garrison | July 10, 1956 |
| 2,796,029 | Bourke | June 18, 1957 |

FOREIGN PATENTS

| | | |
|---|---|---|
| 18,148 | Great Britain | Feb. 9, 1914 |